Figure 3:
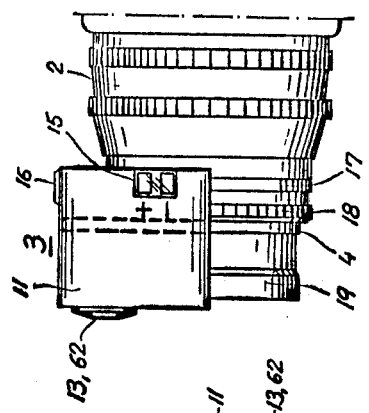

United States Patent [19]
Frode et al.

[11] 3,988,749
[45] Oct. 26, 1976

[54] DEVICE FOR AUTOMATIC DIAPHRAGM SETTING IN PHOTOGRAPHIC CAMERAS

[75] Inventors: Ralf Sture Frode, Pixbo; Anders Engstrom, Lindome, both of Sweden

[73] Assignee: Fritz Victor Hasselblad, Goteborg, Sweden

[22] Filed: Apr. 21, 1975

[21] Appl. No.: 569,688

Related U.S. Application Data

[63] Continuation of Ser. No. 395,127, Sept. 7, 1973, abandoned.

[30] Foreign Application Priority Data

| Sept. 20, 1972 | Sweden | 12137/72 |
| June 5, 1973 | Sweden | 7379279 |
| June 26, 1973 | Sweden | 7389534 |
| June 26, 1973 | Sweden | 7389542 |

[52] U.S. Cl. .................. 354/44; 354/41; 354/42; 354/46; 354/271
[51] Int. Cl.² ............................... G03B 7/08
[58] Field of Search .............. 354/40, 41, 42, 43, 354/44, 45, 46, 47, 270, 271

[56] References Cited
UNITED STATES PATENTS

| 2,655,086 | 10/1953 | Walker | 354/271 |
| 2,890,641 | 6/1959 | Field | 354/271 |
| 3,533,347 | 10/1970 | Auguste et al. | 354/40 |
| 3,541,941 | 11/1970 | Barr et al. | 354/271 |
| 3,816,841 | 6/1974 | Maronde et al. | 354/41 |

*Primary Examiner*—Russell E. Adams, Jr.
*Attorney, Agent, or Firm*—Sherman & Shalloway

[57] ABSTRACT

An automatic diaphragm control for camera lenses having independent diaphragm and shutter speed rings in which a reversible motor is positioned to drive the diaphragm ring, and a gear engaging the diaphragm ring drives a potentiometer. A light-sensor is in circuit with the motor and the potentiometer to drive the diaphragm ring to cause the potentiometer to balance the light-sensor output. The position of the diaphragm ring and the potentiometer is adjustable for film speed and for the selected shutter speed.

21 Claims, 14 Drawing Figures

DEVICE FOR AUTOMATIC DIAPHRAGM SETTING IN PHOTOGRAPHIC CAMERAS

This is a continuation of application Ser. No. 395,127, filed Sept. 7, 1973, now abandoned.

This invention relates to photographic cameras having lenses provided with a diaphragm and an interlens shutter, the setting means of which are designed as rotary rings co-axial with the lens, and preferably to cameras equipped with interchangeable lenses and an electric film transport. The invention refers to an automatic diaphragm control comprising an electronic exposure meter, which controls a motor driving the diaphragm ring of the lens. This measuring, controlling and driving part is designed as one unit, which is mounted outside on the lens on a per se known extra accessory fitting fastened on the lens. The normal setting rings of the lens are replaced by special rings capable of rotating freely relative to each other. These rings are equipped with toothed segments meshing with the pinion and, respectively, the gear wheels of the motor which transfer to the exposure meter the information to set the shutter speed and the aperture size. The information on the film speed value is supplied to the exposure meter by means of a manually adjustable rotary knob. The device is further provided with two indicator lamps, one of which shows if the adjustment of the diaphragm is going on, while the other indicates if the diaphragm ring has been turned to one or the other of the limit positions where a limit switch has broken the current circuit of the motor. As current source normally serves the same battery, which supplies the film transport mechanism with current but, if necessary, a separate current source can be used. The device according to the invention renders it possible to provide, by relatively simple means and at reasonable cost, a camera of the described type with an automatic diaphragm control adapted to be mounted on a plurality of interchangeable lenses with different focal lengths.

Some known motion picture and still cameras are provided with, as standard equipment, a so-called automatic diaphragm control rigidly built-in in the camera itself. This term "automatic" is not fully correct because in reality it constitutes a kind of semi-automatic device, which requires an impulse from the photographing person who, for example, must depress a key or the like for actuating the device. Such devices differ from the present invention both from a principle and design point of view.

It is also known to design diaphragm controls as an extra accessory to be mounted on the camera. These diaphragm controls are substantially intended for use on movie and television cameras where there is a great demand of such a device. However, such constructions for still cameras, preferably motor-driven, are known. The known devices have, in common, the fact that the automatic system is not complete. Usually, but not always, a means is provided by which it is possible, prior to the photographing to correct for the speed of the film used. For correcting the device for the selected shutter speed or image speed, usually an adjusting means is provided which, however, is not controlled by the speed setting means of the camera, for example the speed ring on the lens. It is, therefore, necessary upon a change of the shutter speed to adjust both the speed setting means of the camera and the speed setting means of the automatic diaphragm control. The known accessories for diaphragm control are thereby made semi-automatic and differ in principle from the present invention.

The present invention relates to photographic cameras, preferably system cameras of the single-lens reflex type for picture sizes 6 × 6 cm and larger, and which are provided with interchangeable lenses equipped with a preset diaphragm and an interlens shutter and with an electrically-driven device, which automatically advances a new film frame after a after completed exposure, cocks the shutter. A battery built into the camera feeds this device, which, alternatively, also can be connected to an external current source via contacts on the outside of the camera. The camera may be released by remote control, a by means of a cable, wireless or by other impulses, via another outside contact on cameras of this type. Suitable exposure data, shutter speed and aperture size, are set according to the information given either by the exposure meter of the camera, if the camera includes such a meter, or by a separate exposure meter. The diaphragm and shutter are provided with setting means in the form of rotary grip rings coaxial with the lens. Said setting rings are identically equal with respect to function, size and relative positions for a plurality of lenses with different focal lengths within the series of interchangeable lenses of the camera system.

Cameras of the afore-described type, when provided with the usual accessories, are equipped so well that they are particularly well adapted for most photographs to be taken. Especially the motor-driven varieties of these cameras are often used when long series of pictures are to be taken with the help of remote-control release equipment. When pictures of the same subject, for example an instrument panel or a surgical operation, are to be taken, with the lighting being substantially constant, this use of the camera does not involve any problems, because one can work with fixed, pre-set exposure data. When, however, the subject changes from one picture to the other, for example in aerial surveying of alternatingly light-and dark-terrain sections and with a motor-driven camera built-in in the aircraft frame, the exposure data of the camera must be adjusted in view of the brightness value of the subject. Conversely, the subject may be constant, but the lighting may vary, for example when a bird's nest is to be photographed for a long period of the day with a concealed camera with remote-control release. In such cases as exemplified above, prior systems lack a fully automatic device of some kind which controls the exposure data of the camera. The necessary adjustments, therefore, had to be made. For to this reason, the camera was necessarily placed accessibly or provided with some remote control device of a simple kind. This involves, the disadvantage among other, that one cannot make use of the rapid picture sequence of the motor-driven camera, which often is desired.

If one wants to construct a device, which controls the exposure means of the camera in relation to the varying lighting, one can make either one of the aperture size or shutter speed vary with the lighting, in which case the non-varied factor is pre-set to a value suitable for the photographing in question. It appears from the typical cases exemplified above, that either the subject (the bird) or the camera (the aircraft) is movable relatively rapidly. Therefore, for given photographing occasion, and for obtaining pictures without disturbing blurring by motion, a minimum shutter speed obtains, which must not be exceeded. This minimum shutter speed can be estimated or calculated in advance with satisfactory accuracy. The desired device, therefore, should vary the aperture size, and this is the object of the present invention. If a camera of the type described above is to be completed with an automatic diaphragm control, this control must satisfy several requirements for being practical and reliable and procurable at a reasonable price. The advantages of the present invention are as follows:

1. The device is intended for a camera with interchangeable lenses, the respective diaphragm rings of which are to be controlled. It is, therefore, desirable to arrange the device on the lens. In order not to have to procure a device for each lens in question, it is further desirable, that the design of the device renders it possible to use the device interchangeably on several different lenses.

This is achieved according to the invention, in that the measuring, controlling and driving parts of the device are designed as one complete unit, which is mounted on the upper side of the lens in a per se known accessory fitting assembled with the lens body. The normal setting rings of the lens for the diaphragm and shutter are replaced by special rings, which are not detachably coupled together for the so-called light-value and, therefore, can move freely relative each other. The speed ring, therefore, can be preset manually to a suitable shutter speed whereafter the automatic system sets the diaphragm ring to a value corresponding to the lighting and film speed. The special rings are provided with external toothed sectors, which mesh with the gear wheels on the measuring, controlling and driving unit, which drives the diaphragm ring and, respectively, transmits information on shutter speed and aperture size. The accessory fitting and setting rings for aperture and speed are uniform for a plurality of interchangeable lenses. The device according to the invention can be given the same design for these lenses and when desired, can be transferred by relatively simple means from one lens to another.

2. For obtaining a correct measuring result, the angle of incidence of the lens and the angle of incidence of the light meeting the measuring cell of the device must be equal.

According to the invention, the measuring cell is disposed in a tubular sleeve, which in its forward portion has an opening for the incident measuring light. The measuring cell is mounted on an axially movable holder, which can be adjusted by an adjusting screw provided in the rearward portion of the sleeve. The angle of the incident measuring light is a function of the distance between the measuring cell and said opening. The desired measuring angle is adjusted by moving the holder with the measuring cell, by means of the adjusting screw, to a position corresponding to the measuring angle, for which purpose the holder is movable within a range corresponding at least to the greatest and the smallest measuring angle, i.e. the extreme values for the angles of incidence of the lenses in question.

3. Cameras equipped with an accessory according to the invention preferably should be placeable in readily available spaces, for example in a camera compartment built into an aircraft, which compartment often is very small and intended for the camera without extra accessories. The desire common for all accessories applies also in this case: the accessory should be of a small size and, if possible, so disposed on the camera that it does not render the work of the photographer unnecessarily more difficult.

The device according to the invention is disposed above the lens and constitutes a compact accessory of saddle-shape, the outer dimensions of which lie within the planes coinciding with the side surfaces of the camera and, respectively, its upper part. It is, therefore, possible to utilize available camera compartments in, for example, aircrafts without expensive renovation. The device according to the invention is so dimensioned and disposed, that all control means on the camera are conveniently accessible. Other accessories, for example filters and lens shades, can be mounted on the lens without interference from the device according to the invention.

4. The measuring cell in the device according to the invention must have such a characteristic of the relation between the lighting intensity on the measuring cell and the control signal emitted by the cell to an amplifier included in the measuring device, that said signal is correlated to the relation between the angles of rotation of the diaphragm ring as a function of the size of the aperture opening. Upon rapid changes of the lighting intensity on the measuring cell, it must be able, without troublesome inertia, to follow the lighting variations so that the adjustment of the diaphragm takes place rapidly.

The aforesaid desired objects are achieved in that the device according to the invention is provided with a silicon photocell as measuring cell. In light conditions the silicon photocell emits a voltage, which varies linearly when the lighting varies exponentially. This renders it possible to provide the carbon path, which is included in a restoring potentiometer in the servo-amplifier controlled by the silicon photocell, with a linearly variable resistance. A linear potentiometer with good precision can be manufactured in a simpler and cheaper way than a logarithmic potentiometer, which would have been required if the measuring cell was of CdS-type. The silicon photocell has the further advantage over a CdS-cell, that it is substantially free of inertia, so that the diaphragm is adjusted rapidly in reaction to lighting variations. The silicon measuring cell, however, is temperature-responsive in such a manner, that the signal level falls linearly with rising temperature. In order to enable the device to set the correct aperture size independently of the temperature of the environment of the photographing occasion, the responsiveness of the silicon measuring cell has been compensated for by means of a silicon diode having the same temperature characteristics as the silicon measuring cell. The function is described in conjunction with the application examples given below.

5. The device according to the invention is probably applied mostly on motor-driven cameras. It is, therefore, desirable to provide the device for the same voltage as the motor, so that the device can be fed from the current source of the motor, whereby the device according to the invention must not be disturbed by the unavoidable voltage drops occurring during the short moments of operation of the motor. The device, in order to be applicable to a camera with manual film advance, must alternatively be able to be connected to a separate current source.

These desired objects are achieved in such a manner, that the device according to the invention which is adapted to the motor voltage of the camera, is provided with a cable, the connecting means of which fits a current tap on the camera or, alternatively, a separate current source. The motor-driven camera is provided with a previously known electromagnetic coupling means which, during the operation time of the motor, renders said current-tap dead. This coupling means is not part of the present invention.

The device according to the invention becomes deactivated currentless, so that the voltage drop caused by the motor does not affect the device. The electronic part of the invention, moreover, is so connected that the sensitive input steps of the circuit are protected against interferences, which may enter via the current source. This coupling is described in greater detail in conjunction with application examples of the invention given below.

6. Before a picture is exposed by the photographing person, the automatic system must have adjusted the diaphragm to the correct value. The photographing person, therefore, in order to avoid incorrectly exposed pictures, must have the opportunity for ensuring, rapidly and simply, that the correct value has been set. The photographing person further must have the opportunity to determine whether the lighting, in relation to the film speed or the selected shutter speed is so weak and, alternatively, so strong that the necessary aperture size lies beyond the limits of the control range of the device.

In order to meet these requirements, the device according to the invention is provided with two control lamps, which are well visible from the outside and marked by plus and, respectively, minus signs. The plus-lamp lights when the lighting is too strong, and the minus-lamp lights when the lighting is too weak in relation to the actual aperture size. When the correct aperture size lies within the control range and the adjusting is going on, then the lighting lamp will extinguish when after a moment the adjusting is completed. The camera is then ready for exposure. When both lamps do not extinguish, this indicates that the correct aperture size lies beyond the control range of the device. With the guidance of that lamp which lights, the photographing person must choose another shutter speed and/or change the lighting in such a manner, that the correct aperture size will lie within the control range. In the case of remote control of the camera, extra control lamps can be connected to contacts provided outside on the device. The way these control lamps are connected will be described in greater detail in conjunction with application examples given below.

7. If the correct aperture size lies beyond one or the other of the limits for the control range of the device, there is the risk that the adjusting motor, with its associated power transmission, may be damaged when it continuously operates against a fixed stop in the limit position.

In order to prevent damages of the motor and power transmission, the device is provided with limit switches disposed on the diaphragm ring, which switches break the current to the motor immediately before the diaphragm ring arrives at its respective limit position. A simple slip clutch built into the pinion of the motor limits the torque so that the transmission is not subjected to detrimental stresses when the diaphragm ring, because of by the remaining kinetic energy of the system, is driven against anyone of its fixed stops in the limit positions.

8. In order to be applicable to varying film speeds, the device, which itself senses the exposure factors of aperture size and shutter speed, must be informed in a suitable way of the speed of the film used.

For this purpose, the device according to the invention can be adjusted manually by means of a rotary knob with a film speed index disposed on the front side, by which knob the position of the carbon path in the restoring potentiometer of the measuring device is adjusted.

9. The advantage of the small dimensions of the device according to the invention was already pointed out above. The small dimensions, however, must not unfavourably affect the reliability of the device or unnecessarily render the manufacture more expensive or servicing more difficult.

For this reason, the details incorporated in the device are divided into groups of components, such as drive unit, measuring cell, restoring potentiometer, circuit card for the electronic components etc., each of which is mounted for easy accessibility on the accessory fitting. The entire assembly is thereafter covered by a protective housing, in which no components are rigidly mounted. The device, thus, is easily accessible for service.

10. When the correct aperture size has been set, the motor is made currentless as discussed above. Kinetic energy remaining in the system would cause the diaphragm ring to be moved a distance past the correct aperture size. This would result in an impulse given to the motor to rotate in the other direction. The diaphragm then will again pass the correct aperture size. For each such passage of the correct aperture size, said size is exceeded by a distance which becoms shorter from one passage to the other. After 3–4 of such oscillations, the error is insignificant, and the motor does not receive an impulse for correcting the aperture size, because the sensitivity level of the controlling unit is selected so that the oscillation will cease at setting errors having no practical importance. The time which the described adjusting oscillation would take delays the readiness for action of the camera. The oscillation at the same time would make it difficult to set the diaphragm, in those cases when the correct aperture size lies at or close to the greatest and, respectively, smallest apertures. It is, therefore, important that the motor stops, as immediately as possible after it has become currentless, at the correct aperture size.

This desired effect has been achieved, in that the motor is braked by a relay, which short-circuits the motor when it becomes currentless at the correct aperture size. The relay is controlled electronically, in such a manner, that the output signal emitted by the control part of the device for determining the rotation direction of the motor, is utilized also for controlling the relay. When the motor is short-circuited, it is forcefully braked in known manner and stops almost immediately. Therefore, the maladjustment of the diaphragm is negligible, and the correct setting of the diaphragm is achieved rapidly, as desired, while at the same time the difficulties of setting the correct value, at or close to the limit positions of the diaphragm, are eliminated.

Figure 4:
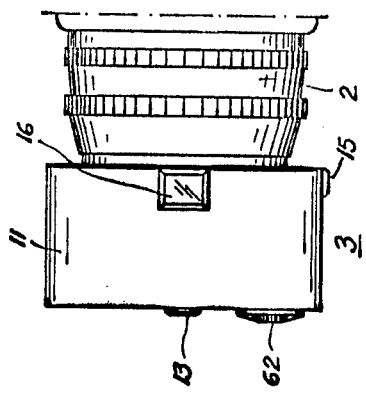
Figure 5:
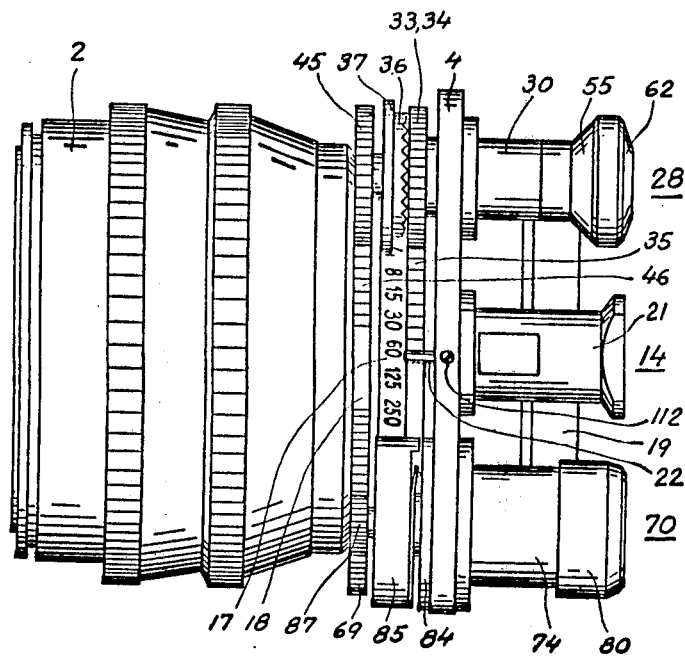
Figure 6:
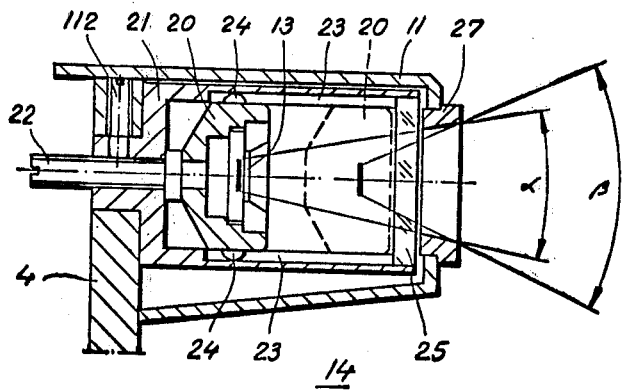
Figure 7:
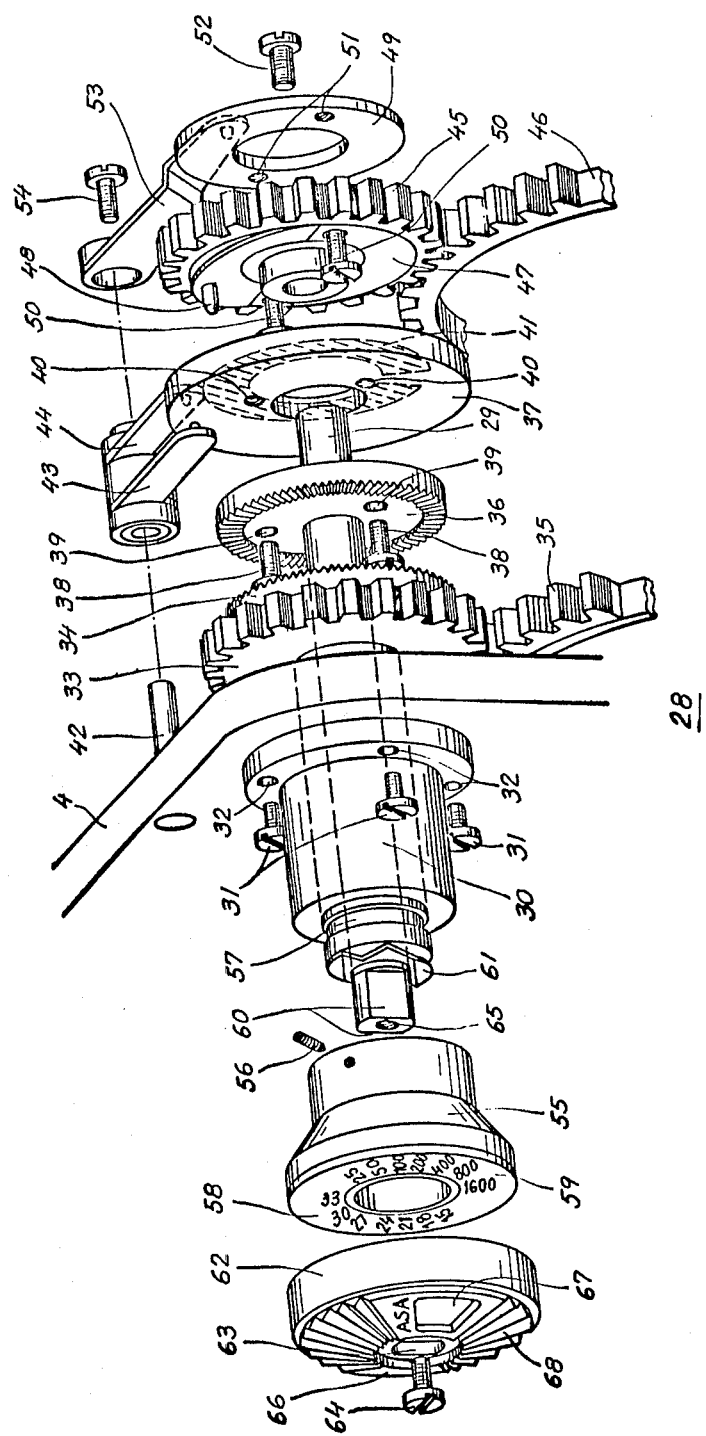
Figure 8:
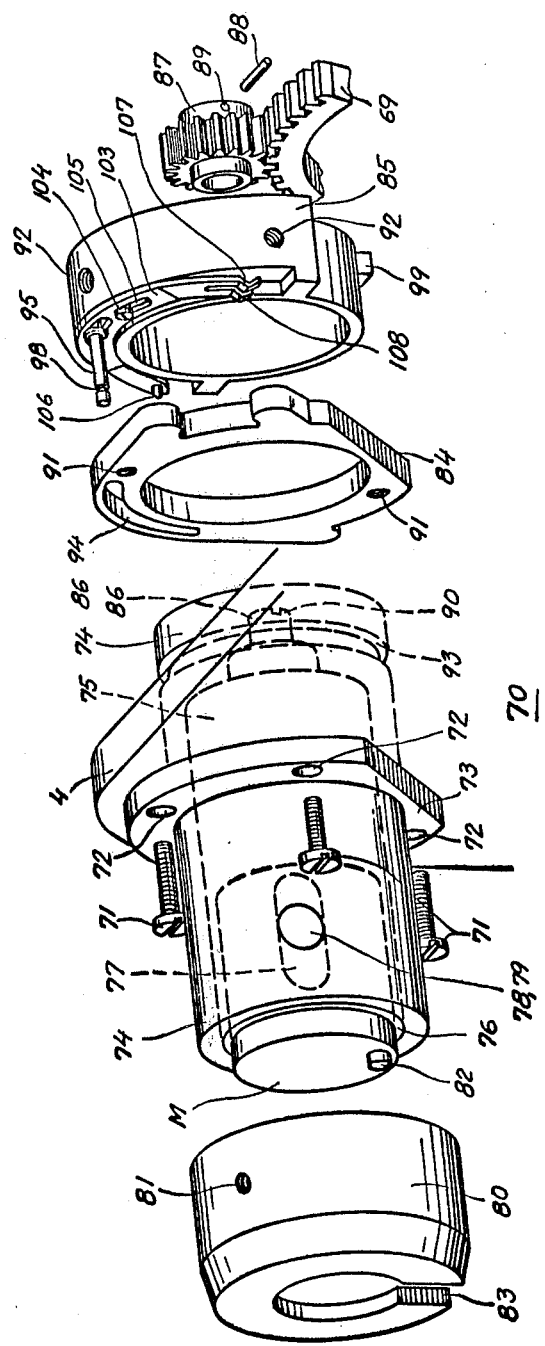
Figure 9:
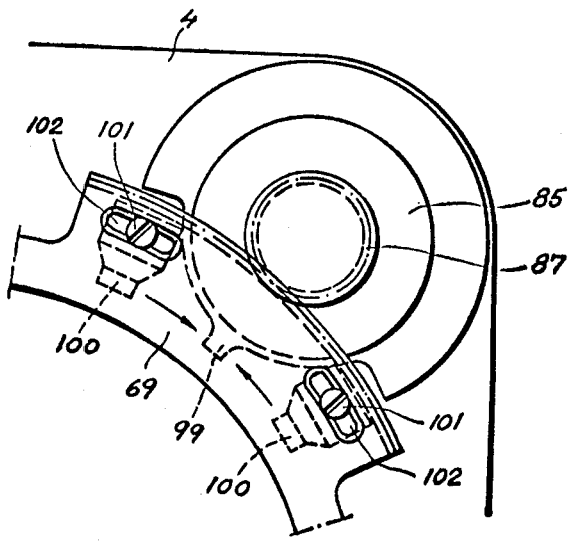
Figure 10:
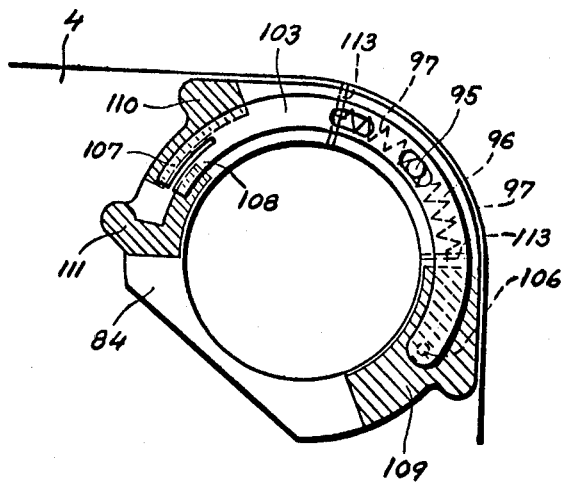
Figure 11:
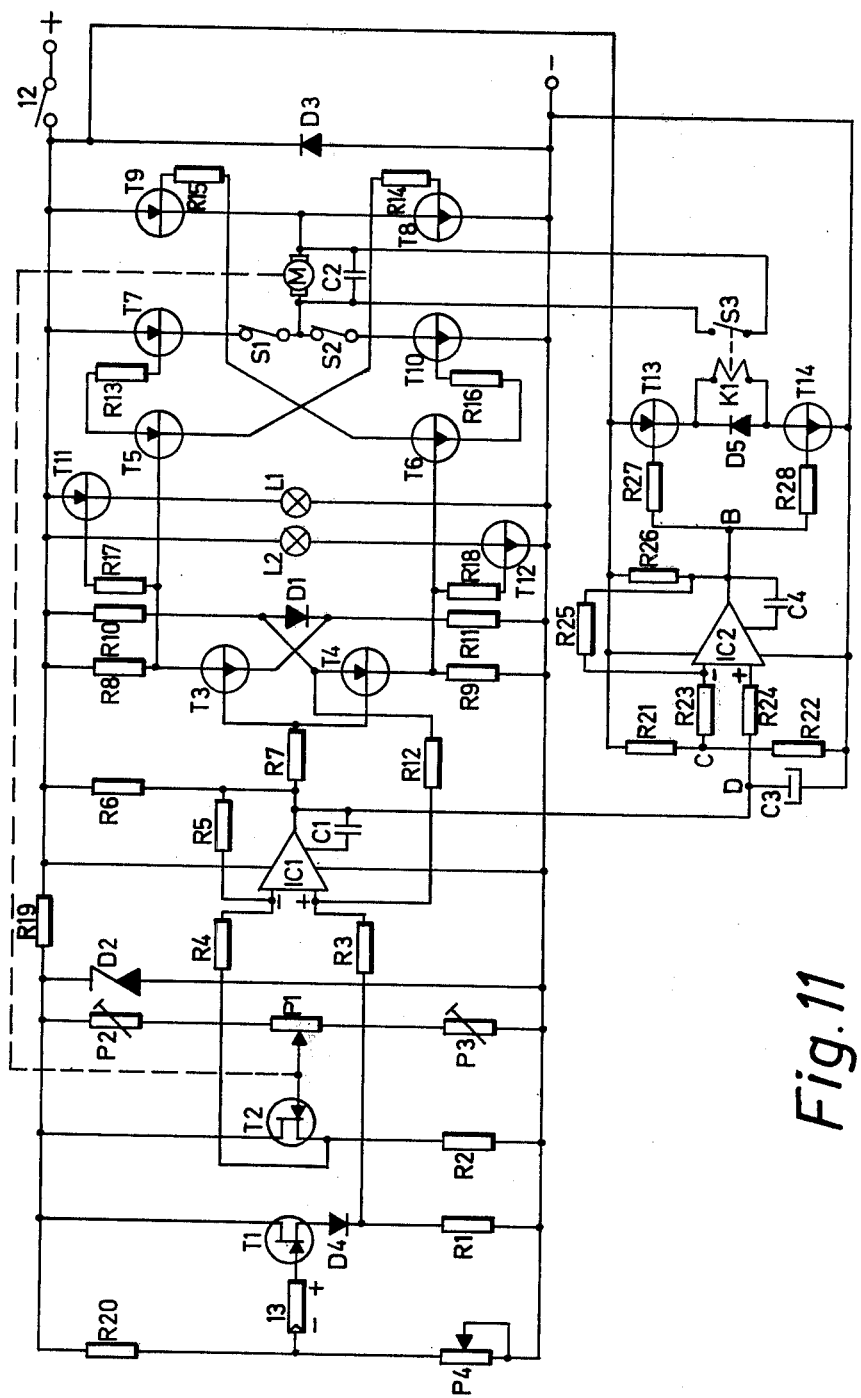
Figure 12:
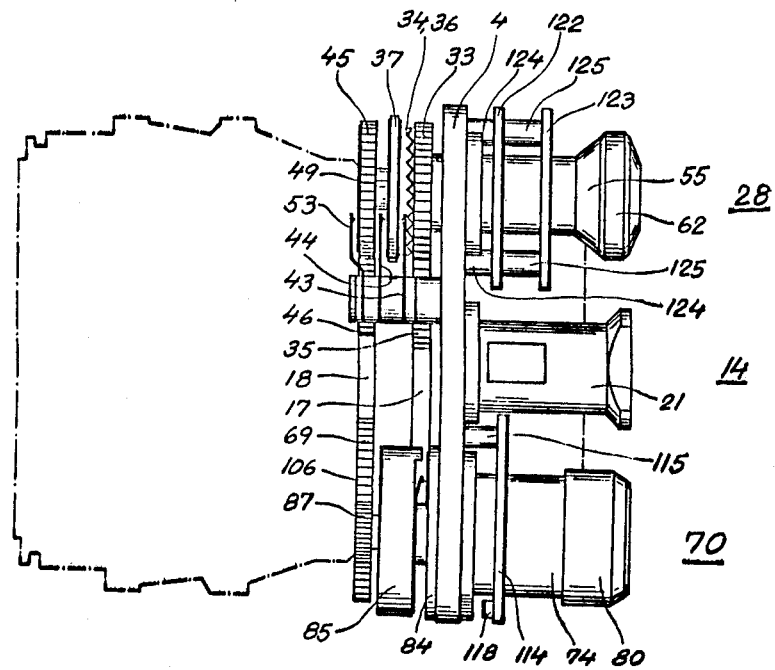
Figure 13:
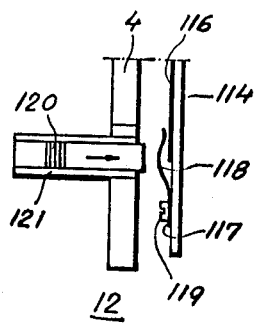
Figure 14:
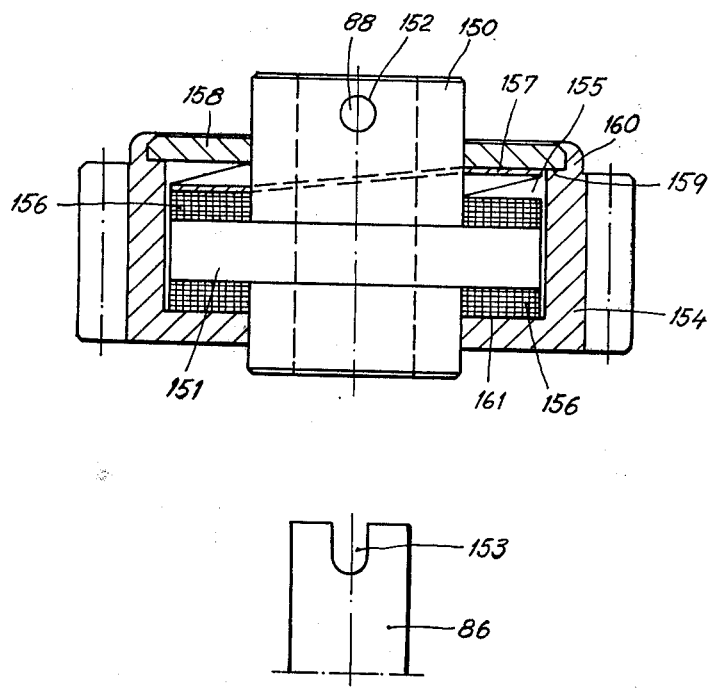

A preferred embodiment of the invention, in which the aforesaid and other advantages of the invention become apparent, is described in greater detail in the following, with the help of the attached drawings and claims. In the drawings, FIG. 1 shows a plan view of a motor-driven camera, viewed from the front side with the device according to the invention mounted on the lens, FIG. 2 shows a plan view corresponding to FIG. 1, but with the camera viewed from the right-hand side, FIG. 3 shows a plan view of the lens according to FIG. 2, but viewed from the left-hand side, FIG. 4 shows a plan view corresponding to FIG. 3, but viewed from above, FIG. 5 shows a plan view, viewed from above and corresponding to FIG. 4, but with the protective housing for the device according to the invention taken off and certain electronic details removed, FIG. 6 shows a vertical longitudinal section through the measuring cell of the device with its holder, FIG. 7 shows a perspective view of the details, pulled apart, which co-act with the restoring potentiometer of the device, FIG. 8 shows a perspective view of the details, pulled apart, which are incorporated in the driving part of the device, FIG. 9 shows a plan view of a limit switch means mounted on the diaphragm ring of the lens, FIG. 10 shows a plan view of details in the breaker mechanism according to FIG. 9, FIG. 11 shows a circuit diagram for the electronic part of the device, FIG. 12 shows a plan view corresponding to FIG. 5, showing the location of the circuit cards, FIG. 13 shows a plan view of the switch of the device, and FIG. 14 shows a detail of the motor pinion of the device with built-in slip clutch.

The reference numerals for the respective details are the same in all Figures. The terms right-hand and, respectively, left-hand used in the following description refer to the camera sides, when viewed in its photographing direction.

Figure 2:
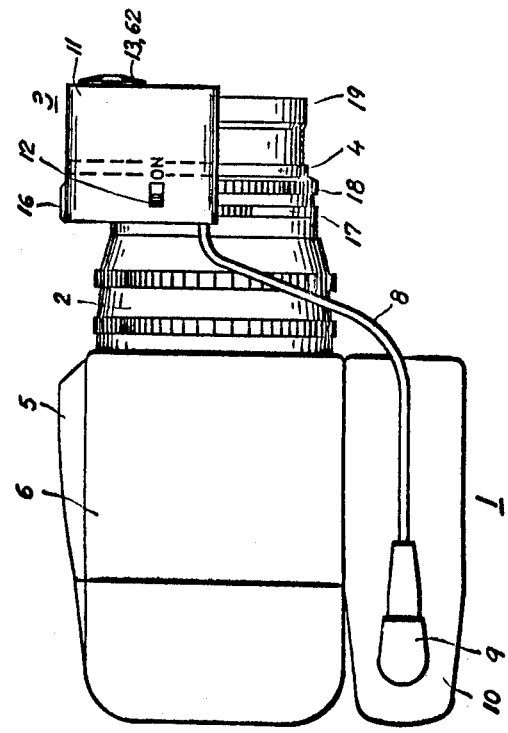
Figure 1:
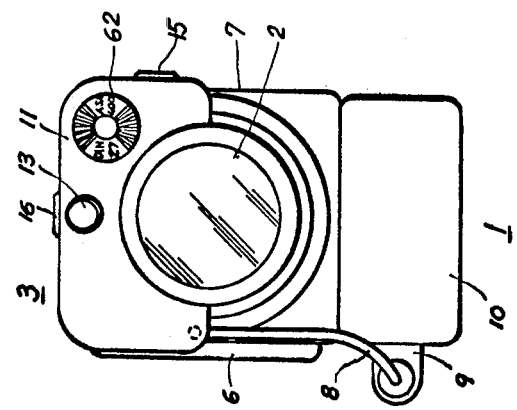

In FIGS. 1 and 2, the reference numeral 1 designates a motor-driven camera, upon the interchangeable lens 2 of which a device according to the invention for automatic diaphragm control 3 is mounted on a known accessory fitting 4 fastened in the lens. The known accessory fitting 4 is of the type disclosed in Ser. No. 387,633 filed Aug. 13, 1973, now U.S. Pat. No. 3,893,138, herein incorporated by reference. The diaphragm control 3, which has a saddle-shape, is disposed on the upper, forward portion of the lens 2 and is so dimensioned that its outer dimensions substantially are limited or defined by planes through the upper surface 5 and the side surfaces 6, 7 of the camera. A cable 8, provided with a plug 9, connects the diaphragm control 3 with a current socket on the battery compartments 10 of the camera 1. The plug 9 may alternatively be connected to an outer current source (not shown). A housing 11 covers the components incorporated in the diaphragm control. On the right-hand side of the housing 11, a recess is provided for a sliding switch 12 connected in series with the current source. Forwardly on the housing 11 an opening for a silicon measuring cell 13 and an opening for a rotary knob 62 for adjusting the film speed value are provided. On the left-hand side of the housing 11 a holder 15 for two indicator lamps is detachably mounted. The function of said lamps is described below in conjunction with FIG. 3. On the upper side of the housing 11, FIG. 4, a window 16 is provided for reading the shutter speed set on the speed ring 17 of the lens 2. As appears from the following, a corresponding reading of the diaphragm ring 18 of the lens on its normal index cannot be made, because the index is concealed. The diaphragm ring 18, therefore, is provided on its lower portion, which is visible from the outside, with an extra aperture scale with associated index (not shown). As is apparent from FIGS. 1–4, the automatic diaphragm control 3 renders it possible, by its form, size and location, to use the camera 1 provided with diaphragm control 3 in a camera compartment, which is intended only for the camera 1 with remote control. Besides, all control and indicating means of the camera 1 and diaphragm control 3 are easily accessible and, respectively, visible during normal photographing. The device according to the invention, thus, does not appreciably affect the good preparedness of the camera 1. Usual camera accessories, such as lens shades, filters and auxiliary lenses can be unobstructedly attached to the diaphragm control 3. Said accessories are mounted on a bayonet ring 19 on the accessory fitting 4.

The electronic design of the device is described before the mechanical design of the automatic diaphragm control 3 will be dealt with in detail.

The automatic diaphragm control includes as measuring part the aforementioned silicon measuring cell 13, the output signal of which being responsive to the prevailing lighting, controls a servo-amplifier, which in its turn controls both a motor which turns the diaphragm ring 18 and two indicator lamps. When one lamp or the other lights, it indicates that regulation is going on or that the diaphragm ring 18 has been turned to one of its limit positions, whereby a limit switch has broken the current supply to the motor. When the servo-amplifier is in balance, the motor does not operate and both indicator lamps are extinguished. The output signal emitted from the measuring cell 13 is then matched by an aperture size set correctly in relation to the lighting, the selected shutter speed and the film speed. In order to render possible a correct setting of the aperture size, the servo-amplifier must be informed, in addition to the light intensity which the measuring cell 13 signals, also of the selected shutter speed as well as of the film speed used and the actual aperture size. The servo-amplifier, therefore, includes a restoring potentiometer, which, by means of an adjustable and rotatable resistance path and by means of a movable sliding contact, is informed of the film speed, shutter speed and aperture size. A detachable coupling is provided between the resistance path and a rotary knob for setting the film speed, so that the angular position of the resistance path can be adjusted in relation to the film speed used. From this starting position, the resistance path can then be turned responsive to the selected shutter speed, as the speed ring 17 is coupled together by a gear with the axle of the resistance path. A similar gear is provided between the diaphragm ring 18 and the movable sliding contact and moves the sliding contact to a position corresponding to the actual aperture size. When the motor-driven diaphragm ring 18 in its turn has turned the movable sliding contact to a position on the resistance path in which the voltage is the same as that emitted by the silicon measuring cell 13, the diaphragm ring 18 assumes a position corresponding to the correct aperture size. The motor becomes thereby currentless and stops.

The aforementioned silicon measuring cell 13 has properties rendering it more suitable than a measuring cell of CdS-type, which usually is provided in exposure meters. Compared with the CdS-cell, the silicon cell has an insignificant inertia and its output signal, therefore, adjusts rapidly to varying lighting intensity. This in its turn permits a rapid adjusting of the aperture size. The output signal is emitted as a voltage, which increases linearly when the lighting intensity increases exponentially, i.e. the linearly increasing turning of the diaphragm ring 18, upon unbalance of the restoring potentiometer, corresponds to a linear-voltage increase of the silicon measuring cell 13. Owing to the linear properties of the silicon measuring cell 13, therefore, the resistance path of the restoring potentiometer can be designed as a carbon path with linear characteristics. Such a restoring potentiometer is much cheaper to manufacture with a good tolerance or accuracy as compared with the logarithmic characteristics required by a CdS-cell.

The electric function of the device will be described below. The device is connected according to the diagram shown in FIG. 11. The silicon measuring cell 13 has its negative electrode connected to the central point of a voltage divider formed of a stationary resistance R20 and a trimming potentiometer P4, and has a positive electrode connected to the g-electrode of a field-effect transistor T1. The field-effect transistor T1 is one half of an impedance transformer coupling consisting of two field-effect transistors T1 and T2, with associated load resistances R1 and R2. The impedance transformer coupling is provided in order to prevent the silicon measuring cell 13 from being subjected to load, so that its linear characteristics can be utilized. The silicon measuring cell 13 is compensated for changes in its output voltage, due to temperature variations, by means of a silicon diode D4, which has its anode connected to the s-electrode of the field-effect transistor T1, and its cathode connected to a stationary resistance R1. The silicon diode D4 and the silicon measuring cell 13, which have the same temperature characteristics, are predetermined to have the same temperature relative to each other, since they are mounted close to each other within a housing enclosing all components. If the voltage between the positive electrode of the silicon measuring cell 13 and the Zero conductor of the diagram changes, due to a change in the temperature of the silicon measuring cell 13, a corresponding change is obtained of the voltage between the s-electrode of the field-effect transistor T1 and the Zero conductor, due to the fact that the voltage over the silicon diode D4 changes by the same amount. Thus, the output signal emitted by the field-effect transistor T1 becomes non-responsive to temperature. The second field-effect transistor T2 is controlled by the voltage level, which is taken out from a voltage divider consisting of a potentiometer P1 and a trimming potentiometer P2 and, respectively, P3 connected in series on each side of said potentiometer P1. The potentiometer P1 is identical with the aforementioned restoring potentiometer, the rotary contact of which is controlled by the diaphragm ring 18, which in its turn is driven by a motor M, which in FIG. 11 is indicated by a dashed line between P1 and M. The motor M is connected in parallel with a spark-extinguishing capacitor C2. The two voltage levels at the "source"-electrodes of the field-effect transistors T1 and T2, which levels are equal upon a balance of the circuit, are moved via resistances R3 and, respectively, R4 to an operation amplifier IC 1 of integrated design. The resistance R3 limits the temperature-drifting of the circuit, and the resistance R4 and a resistance R5 determine the amplification of the operation amplifier IC 1. The output signal of the operation amplifier IC 1 places itself at the level of half the feeding voltage at equal levels on the inputs + and, respectively, −. Upon an increasing lighting intensity incident on the silicon measuring cell 13, the level rises on the non-inverting input, +, of the operation amplifier IC 1, as compared with the level on the inverting input, −. Inversely, a decrease in the lighting intensity lowers the level on the non-inverting input, +. A capacitor C1 prevents self-oscillations in the operation amplifier, and a resistance R12 renders positive feed-back. A resistance R6 serves as load resistance for the operation amplifier IC 1.

The signal from the operation amplifier IC 1 is transferred via a current-limiting resistance R7 to a pair of complementary transistors T3, T4. The respective emitters of the transistors T3 and T4 lie with respect to voltage fixed by means of a voltage-divider with resistances R10, R11 and the forward voltage drop in a silicon diode D1. The circuit being in balance, the transistors T3 and T4 are throttled, but upon an increase of the level at their base connections coupled together, the NPN-transistor T3 begins to conduct and, thereby, the voltage on the collector of the transistor T3 drops. To the collector of the transistor T3 is connected the base of a transistor T5 in a pair of complementary transistors T5 – T6, which pair of transistors have resistances R8 and, respectively, R9 to ensure throttling in the absence of a signal. Also the base of a transistor T11 is connected via a current-limiting resistance R17. The PNP-transistor T11 now begins to conduct, and a lamp L1 is lighted and indicates, that the circuit is out of balance. Also the PNP-transistor T5 begins to conduct as well as a complementary transistor pair T7–T8. Thereby the motor receives current and starts. Owing to the mechanic coupling between the motor M, diaphragm ring 18 and restoring potentiometer P1 (dashed line in FIG. 1), the movable contact in P1 then rotates until its output voltage is in agreement with the voltage over the silicon measuring cell 13. Thereby the motor M stops, and the lamp L1 extinguishes when the circuit is in balance, i.e. the correct aperture size is set.

Inversely, when the lighting intensity on the silicon measuring cell 13 decreases, a corresponding adjusting of the restoring potentiometer P1 takes place via the transistors T4, T6 and a complementary pair T9, T10 and a transistor T12. Thereby a lamp is lighted and the motor M rotates in opposite direction. The lamps L1 and L2 are mounted in the holder 15 shown in FIG. 3, the lamp L1 there being marked by "+" and "−" the lamp L2 by −.

In order to limit the base current to the transistors T7, T8, T9, T10 and T12, the transistors are coupled with resistances R13, R14, R15, R16 and, respectively, R18, as the transistor T11 is coupled with the resistance R17.

Due to the drop of the base and emitter voltage at the transistors T3 and T4, an undesired threshold arises which prolongs the reaction time of the automatic system. This threshold is reduced by means of the forward voltage drop of the silicon diode D1, but is not entirely eliminated. The result of an elimination would be that the circuit becomes instable and would oscillate permanently about the balance position of the restoring potentiometer P1.

A diode D3 protects the circuit against interferences, which may enter via the current source. A resistance R19 and a Zener diode D2 constitute a stabilization coupling, which lowers the feed voltage and insulates the sensitive input steps of the circuit from any voltage variations of the current source. The circuit, besides, is protected in those cases when it is fed from the battery of the motor-driven camera 1, in such a manner, that the pin in the battery tap which in non-operative camera motor has minus polarity, is shifted to plus polarity for an operative motor condition. The device according to the invention, thus, becomes currentless during the short period when the batteries in the camera are heavily loaded.

Two limit switches S1 and S2 are controlled by the position of the diaphragm ring 18, in such a manner, that they interrupt the current supply to the motor M immediately before the diaphragm ring arrives at the respective limit positions for the control range of the device. The current to the indicator lamps L1 and L2, however, is not broken but the appropriate lamp, as discussed above, lights during the time of adjustment to correct aperture size, continues to light and thereby indicates that the circuit is in unbalance.

The cable 8 for current supply, FIG. 2, is connected to contacts marked by "+" and "−" respectively, − in the circuit diagram, FIG. 11. In order to stop the motor M as immediately as possible when it becomes currentless at the correctly-set aperture size, the motor is provided with an electronically-controlled short-circuit brake as shown to the lower part of the circuit diagram, FIG. 11. The same output signal from the operation amplifier IC1, which controls the motor M in the way described above is also used for controlling an electronic circuit which operates a relay K1, the contacts of which form a switch S3 which, in closed position shortcircuits the motor M. The circuit is built up with an operation amplifier IC2 and a pair of complementary transistors T13, T14, as its main component and operates in principle in the same way as the described circuit with IC1. The relay K1 receives current and shortcircuits the motor M with the switch S3 when the complementary transistors T13 and T14 conduct simultaneously, which is the case when the voltage in a point B at a feed voltage of 6V amounts to 3V ± 2V. The voltage in a point C is determined by two resistances R21 and R22 of equal size and is equal to half the feed voltage, i.e. in this case 3V. In the balance position of the operation amplifier IC1, (i.e. when the correct aperture size is set), the voltage in a point D is also equal to half the feed voltage, i.e. 3V. The operation amplifier IC2 thereby delivers an output level of 3V, and the relay K1 receives current and closes the switch S3. Upon a change of the lighting on the measuring cell 13, the potential in the point D changes and the output level from the operation amplifier IC2, (i.e. the point B), places itself on O or, alternatively 6V (feed voltage). Consequently, the transistor T14 or, alternatively T13, is throttled, which in its turn causes resistance switch S3 to open. A resitance R25 determines the amplification on the operation amplifier IC2 so that the relay K1 will not receive current whilst the motor M still receives current. A diode D5 protects the transistors T13 and T14 against detrimental induction voltages, which are produced in the coil of the relay K1 when the current therein is broken and closed.

The silicon measuring cell used, as described above, has a very short reaction time to changes in the lighting conditions. In order to obtain a stable functioning of the relay K1, it is therefore necessary to filter away, by an electrolytic capacitor C3, any signals which are caused by rapid, short-duration changes in the lighting intensity on the silicon measuring cell. Such interfering signals occur, for example, when fluorescent lamps are used as light sources in photographing.

A capacitor C4 prevents self-oscillations in the operation amplifier IC2. A resistance R24 limits the temperature drifting of the circuit, and a resistance R23 coacts with the resistance R25 to determine the amplification in IC2. A resistance R26 serves as load resistance for the operation amplifier IC2. The transistors T13 and T14 are protected by current-limiting resistances R27 and, respectively, R28.

The electric components are built up on printed circuit cards, which as compact units are assembled with the remaining components of the device.

The location of the circuit cards incorporated in the device becomes apparent from the following detailed description.

The silicon measuring cell 13 with associated details are assembled in a measuring cell unit 14, FIGS. 5 and 6, which is mounted centrally on the accessory fitting 4 by screws (not shown). The silicon measuring cell 13 is mounted in a holder 20, which by a screw 22 can be moved in longitudinal direction in a sleeve 21 through the rearward portion thereof. The screw 22 is secured by a locking screw 112, FIG. 6. Two guide grooves 23 in the sleeve 21 prevent, in coaction with guide shoulders 24 on the holder 20, turning of the holder 20 in the sleeve 21 when the position of the holder 20 is being adjusted by the screw 22. It is thereby avoided that the wires (not shown) to the silicon measuring cell 13 are damaged when the cell is being adjusted. A glass plate 25 mounted in front of the forwardly facing opening of the sleeve 21 protects the silicon measuring cell 13 against moisture, dust and unintentional touching. In FIG. 6 the holder 20 is shown in its rearward position, its forward position being indicated by dashed lines. The angle of the incident measuring light is determined by the diameter of a ring 27 mounted in front of the glass plate 25 in the housing 11 and by the distance of the silicon measuring cell 13 from the ring 27. Due to the adjustability of the position of the silicon measuring cell 13 by the screw 22, the angle of incidence of the measuring light can be varied within the range $\alpha$ to $\beta$. These angles correspond to the longest and, respectively, shortest focal length in the series of lenses, for which the device is intended.

The restoring potentiometer P1 with associated details, described in conjunction with the circuit diagram, FIG. 11, assembled in one unit 28, which is mounted on the accessory fitting 4 in its upper left-hand portion, FIGS. 5 and 7. A hub 30, which is coaxial with a bore in the accessory fitting 4 and fastened thereon by screws 31 through free-fit holes 32, FIG. 7, serves as a holder for a potentiometer axle 29 and the componer*s mounted thereon. An inner gear wheel 33 is supported rotatably in the hub 30, and its sleeve-shaped portion is enclosed by the hub 30. On the side of the gear wheel 33 remote from the hub 30, a stationary, toothed clutch-half 34 is disposed. The gear wheel 33 meshes with a toothed sector 35 provided on the speed ring 17. A second clutch-half 36 mounted on the axle 29, with its toothed side facing the clutch half 34, carries on its opposite side a contact disc 37 of insulating material which, by means of screws 38 through free-fit holes 39 and threaded holes 40, is fastened on the clutch half 36. On the side of the contact disc 37 remote from the clutch half 36, the annular, split carbon path 41, FIG. 7, of the restoring potentiometer is fastened. As the contact disc 37 is rotatable in a manner described below, and the end points of the resistance, i.e. the carbon path 41, of the potentiometer P1 always are to be connected, FIG. 11, the sides and the central bore of the contact disc 37 are partially coated with a metal (not shown) in such a manner, that the end points of the carbon path 41 are in conductive contact each with one side of the metal coats on the contact disc 37. Two sliding contacts 43 and, respectively, 44 insulated from each other and disposed on a stud 42, fastened in the accessory fitting 4, bring about the contact to the end points of the carbon path 41, irrespectively of how the contact disc 37 is rotated. On the potentiometer axle 29 outside the contact disc 37, an outer gear wheel 45 of insulating material is rotatably supported and meshes with a toothed sector 46, FIG. 7, disposed on the diaphragm ring 18, FIGS. 2, 3. A contact spring 47 abuts the side of the gear wheel 45 facing the carbon path 41 with a sliding contact 48, which is fastened on said spring and resiliently rests against the carbon path 41. Said sliding contact constitutes the movable contact of the potentiometer P1 in FIG. 11. The contact spring 47 is in electrically conductive contact with a contact plate 49 disposed in a concealed groove on the opposed side of the gear wheel 45 by means of conductive assembling screws 50, which extend through free fit holes in the contact spring 47 and, respectively, gear wheel 45 and fasten in threaded holes 51 in the contact plate 49. A screw 52 fastened on the outer end of the potentiometer axle 29 rests with its head on the gear wheel 45 and prevents said wheel with its associated components from sliding off the potentiometer axle 29. A resilient, sliding contact 53, resting against the contact plate 49, is fastened outside the sliding contacts 43, 44 on the stud 42. Said three contacts 43, 44, 53 are fixed on the free end of the stud 42 by means of a screw 54.

For adjusting the angular position of the carbon path 41 in relation to the film speed in the manner described above, adjusting means are provided in front of the hub 30. On the portion of the gear wheel 33 projecting out of the hub 30, a film speed ring 55 is mounted rigidly by means of two stop screws 56, which are offset 90° relative to each other and fasten in a groove 57. The forward portion of the film speed ring 55 is provided with speed scales 58, 59 for DIN- and, respectively, ASA- values. The end of the potentiometer axle 29 projecting outside the sleeve-shaped portion of the gear wheel 33 is provided with two planes 60 in parallel with each other and has a spring washer 61 resting against the sleeve-shaped portion of the gear wheel 33. The rotary knob 62 for the film speed is rigidly connected with the potentiometer axle 29 by means of an oblong hole 63, which encloses the plane 60 of the potentiometer axle and a fastening screw 64 in a threaded hole 65 in the end of the potentiometer axle 29. The rotary film speed knob 62 has two windows 66, 67 for reading the film speed scales 58 and, respectively, 59 and is provided on the front side with grip serrations 68.

The restoring potentiometer P1 is informed on film speed, shutter speed and aperture size in the manner as follows:

The film speed value is adjusted by pressing the film speed rotary knob 62, FIG. 7, in the direction of the potentiometer axle 29. Thereby the spring washer 61 is so compressed that the clutch halves 34, 36 no longer mesh with each other. Upon turning the film speed rotary knob 62 in its impressed position, the contact disc 37 rotates simultaneously freely in relation to the gear wheel 33 coupled with the speed ring 17 and to the gear wheel 45 coupled with the diaphragm ring 18. When the film speed value in question becomes visible in one of the windows 66 or 67, one stops the turning operation and releases the pressure on the film speed rotary knob 62. Thereby the spring washer 61 again pulls together the clutch halves 34, 36, so that the contact disc 37 is again connected with the gear wheel 33 and thereby with the speed ring 17. The contact disc 37, with the carbon path 41, is now set in an angular position corresponding to the film speed in question.

The shutter speed is set in the usual manner on the speed ring 17 of the lens, whereby the toothed sector 35, provided on the speed ring, drives the gear wheel 33 and thereby, via the clutch 34, 36, the contact disc 37, the carbon path 41 of which is thereby adjusted to a position corresponding to the shutter speed, FIG. 7.

The aperture-size regulates, in the manner described above, the movable sliding contact 48 of the restoring potentiometer P1, FIG. 7. Upon unbalance between the lighting and the momentary aperture size, the motor M turns the diaphragm ring 18 via a toothed sector 69 mounted on the ring, FIG. 8, in order to open or, alternatively, close the diaphragm so as to attain balance. At the same time the other toothed sector 46 on the diaphragm ring 18 rotates, whereby the gear wheel 45, with the sliding contact 48, rotates until its sliding contact 48 has arrived at a position on the carbon path 41 where balance prevails and the motor M stops. If the point of balance is located outside the end positions of the carbon path 41, one of the limit switches S1 or S2 will break the current to the motor M, FIG. 11, in the way described below. For reading the aperture size, one uses the above-described auxiliary scale (not shown) on the lower side of the lens.

The driving unit will be described in detail below. The components associated with the driving of the diaphragm ring 18 are assembled to a compact driving unit 70, FIGS. 5, 8, 12, which is mounted on the upper right-hand portion of the accessory fitting 4 by means of screws 71 through holes 72 in a mounting flange 73 on a motor housing 74 extending through a hole in the accessory fitting 4. The motor M is assembled with a reduction gear 75 so that the motor M is enclosed in the sleeve-shaped housing 76 of the reduction gear 75, which housing in its turn is enclosed in the motor housing 74, FIG. 8. In order to prevent the housing 76 from turning within the motor housing 74, an oblong guide groove 77 is provided in the housing 76, and a guide shoulder 78 enters the guide groove 77 through a hole 79 in the motor housing 74. A motor housing cover 80 encloses the forward portion of the motor housing 74 and is fastened by two stop screws (not shown), which extend through threaded holes 81 in the motor housing cover 80 toward the motor housing 74. A stud-shaped dog 82 on the forward end wall of the motor M projects into a groove 83 in the motor housing cover 80 so as to prevent the motor M from rotating in the housing 76. On the outside of the rearward portion of the motor housing 74, FIG. 8, a contact disc 84 and a control housing 85 are provided, which are incorporated in the limit switch means for the motor M which will be described below. On the outgoing axle 86 of the reduction gear 75, a pinion 87 (FIG. 14) is provided which meshes with the toothed sector 69 on the diaphragm ring 18.

In order to limit the torsional stresses on the mechanism to non-detrimental values, the pinion 87 is provided with a built-in slip clutch according to FIG. 14. A hub 150 is pressed on the axle 86 and secured against rotation by means of a cylindrical pin 88, which extends through a hole 152 in the hub 150 and an open groove 153 in the free end of the axle 86. The hub 150 is provided with a stationary external flange 151 constituting a power transmitting member in a slip clutch between the hub 150 and a gear ring 154 rotatably supported on the hub 150. The gear ring 154 is provided with a recess 155, in which the flange 151 is disposed. On each side of the flange 151 friction discs 156 are freely supported. A plate spring 75 is clamped between the outer one of the friction discs 156 and a plate 158, which rests against a stop 159 in the recess 156. The plate 158 is thereby fixed in its position in that the edge 160 of the gear ring 154, after the mounting, is riveted over the plate 158. The friction discs 156, by action of the plate spring 157 abutting the plate 158, are pressed against the sides of the flange 151 and the bottom 161 of the recess 155 and thereby effect the desired slip coupling between the hub 150 and the gear ring 154. The device is so arranged that it slips when the torque somewhat exceeds that torque which is required for driving the diaphragm ring 18 between its fixed stops in the end positions.

The limit switch system, FIGS. 8–10, is disposed on the portion of the motor housing 74 facing the diaphragm ring 18 and on the diaphragm ring 18. The object of said system is to break the current supply to the motor M when the diaphragm ring 18 has been turned to one of its limit positions, in response to the light being either too weak or too strong for the selected shutter speed. The limit switch system consists in principle of two switches, which are connected in series with the motor M, and the sliding contacts of which are controlled by means on the diaphragm ring 18. The contact disc 84 of insulating material encloses the motor housing 74 and is mounted on the accessory fitting 4 by means of two of the screws 71, FIG. 8, which fasten in holes 91. Outside the contact disc 84, the control housing 85 is supported rotatably on the motor housing 74, in such a manner, that screws (not shown) extending through threaded holes 92 in the control housing 85 run in a guide groove 93 on the motor housing 74. The contact disc 84 is provided with an arched groove 94, FIG. 8, for a guide pin 95 stationary in the control housing 85 which extends into an arched groove 96, FIG. 10, in the accessory fitting 4. The groove 96, concealed in FIG. 8, corresponds to the groove 94. In said groove 96 are provided two springs 97, which at one end are fastened in a groove 98, FIG. 8, in the guide pin 95 and at the other end are fastened by pins 113 in the respective end points of the groove 96, FIG. 10. The springs 97, due to the symmetrical design of the device, bias the guide pin 95 toward a non-operative position in the centre of the grooves 94, 96, whereby a stop cam 99 disposed on the control housing 85 will be located in the middle between the limit positions of the switch means. The stop cam 99 is operated by two dogs 100, which are mounted by screws 101 through oblong holes 102 in the toothed sector 69 on the diaphragm ring 18. One of the dogs 100, which are fixed in the respective end positions, FIG. 9, makes contact with the stop cam 99 when the motor M tries to turn the diaphragm ring 18 beyond one of its end position. The control housing 85 thereby rotates in one or the other direction, depending on the limit position, which the ring 18 tends to pass. On the side of the control housing 85 facing the contact disc 84, a two-armed resilient contact plate 103 is fastened by means of a screw 104 extending through an adjusting groove 105 in the contact plate 103 and by means of the guide pin 95, which is designed as a stop screw, FIG. 8. One arm of the contact plate 103 is provided with a sliding pin 106, and its other arm is split into two contact tongues 107 and, respectively, 108. The side of the contact plate 84 facing the control housing 85 includes three contact surfaces 109, 110, 111 in the form of metal plates fastened on the insulating material, FIG. 10, in such a manner, that the contact surfaces 110 and 111 co-act with the contact tongues 107 and 108, respectively. The sliding pin 106 and the contact surface 109 are in contact with each other, irrespective of the angular position assumed by the control housing 85. The breaking system is mounted on the contact tongue 107 and contact surface 110 and on the contact tongue 108 and contact surface 111, with the pair 107, 110 corresponding to the switch S1 and the pair 108, 111 corresponding to the switch S2 in the circuit diaphragm according to FIG. 11. In FIG. 10 the components are in the position corresponding to the non-operative position of the control housing 85, as shown in FIG. 9. In this position, both pairs 107, 110 and, respectively, 108, 111 (i.e. the switches S1 and, respectively, S2) are closed, due to the contact surfaces 110 and 111 overlapping one another a short distance, FIG. 10. The motor M, as was apparent from the description of the electronic part of the device, FIG. 11, receives current either via the switch S1 or the switch S2, depending on whether the momentary aperture size is too great or too small. When the toothed sector 69, FIG. 9, moves in the clockwise direction, the aperture size diminishes. Thereby the left-hand dog 100, upon continued movement to the limit position, will turn the control housing 85 in the counterclockwise direction until the contact tongue 107, FIG. 10, releases the contact surface 110, and the motor M stops due to the breaking of the switch S1. In order to make the correct aperture size lie within the end positions of the device, the speed ring 17 is not set to a faster shutter speed. The electronic part of the device then changes polarity, i.e. the rotation direction of the motor M, which receives current via the contact tongue 108 and contact surface 111 (switch S2).

Conversely, when increasing the aperture size, the breaking takes place in the opposed limit position in an analogous manner with the switch S2, i.e. the pair 108, 111, whereby the adjustment to a slower shutter speed causes the motor M to start in the opposite direction of rotation via the switch S1.

The circuit cards are now described in greater detail. The electronic part of the device is built up on three circuit cards disposed on both sides of the measuring cell unit 14, FIG. 12. A one-foil circuit card 114 about the driving unit 70 is fastened at the accessory fitting 4 by means of two insulating supports 115 (one of which is concealed by the motor housing 74 in FIG. 12) with through screws. The contact function of the slide switch 12 shown in FIGS. 2 and 11 is placed on the circuit card 114, whereby contact is established between two metal foils 116 and, respectively, 117 by means of a contact spring 118, FIGS. 12–13, which at one end is connected with the metal foil 117 by means of a fastening screw 119, and the free end of which is somewhat spaced from the metal foil 116 when the contact spring 118 is not loaded. The contact spring 118 is operated by a serrated slide grip 120 in a holder 121 fastened in the accessory fitting 4, FIG. 13. A catch member (not shown) between the sliding grip 120 and holder 121 provides distinct on- and off-positions for the sliding switch 12, which is accessible through a slot made in the housing 11, FIG. 2.

Two double-foil circuit cards 122 and, respectively, 123 are mounted in a similar way on supports 124, 125 about the restoring potentiometer unit. The circuit cards 114, 122, 123 are designed according to a known technique. The wiring between different groups of electric components of the device is disposed in available free spaces below the housing 11 and, for the sake of clarity, is omitted in the Figures, because the principle is apparent from the circuit diagram in FIG. 11.

The housing 11, which is fastened in the accessory fitting 4 by fastening screws (not shown), has no rigidly mounted components, but supports only, by means of a resilient clamp (not shown), the holder 15 for the indicator lamps L1, L2, FIGS. 1–4. This facilitates the mounting as well as the servicing of all component groups included in the device.

The invention is not restricted to the embodiment shown and described. The design and location of the individual components and groups of components may, for example, be varied within the scope of the invention so as to fit the make and size of the respective interchangeable lenses of the kind here contemplated.

We claim:

1. Apparatus for automatic diaphragm control of lenses which are detachably mounted on a camera, wherein each lens has attached thereto a shutter, a shutter speed ring for adjusting shutter speed, a diaphragm, a diaphragm ring for adjusting the opening of the diaphragm and means for removably attaching an accessory mount; the improvement comprising:
   a control unit;
   an accessory mount assembled with each lens for mounting the control unit on the lens;
   said control unit including;
   a reversible D.C. electric motor;
   a first diaphragm gear rotated by said motor for meshing with the diaphragm adjusting ring to rotate the diaphragm ring upon energizing the motor thereby determining the diaphragm opening;
   a second diaphragm gear for meshing with said diaphragm ring;
   aa potentiometer adjusted by said second diaphragm gear to a position having a resistance indicative of the diaphragm opening;
   a light-sensing element having an output dependent upon light incident thereon;
   circuit means connecting said light-sensing element and said potentiometer and having an output energizing said motor for balancing the potentiometer with the output of the light-sensing element in response to a change in light incident on said light-sensing element until the output of the circuit is zero;
   film speed adjusting means for adjusting the position of said potentiometer relative to said second diaphragm gear independently of said shutter speed ring according to a selected film speed;
   shutter speed gear means driven by said shutter speed adjusting ring, when said unit is mounted on the accessory mount for adjusting the position of said potentiometer relative to said second diaphragm gear according to a selected shutter speed.

2. A control as set forth in claim 1, including means for creating an angle of incidence of light on the light-sensing element and means for varying the angle of incidence of light on the light-sensing element.

3. A control as set forth in claim 2, in which the means for creating the angle of incidence is a tubular sleeve and the angle varying means includes means for adjusting the longitudinal positions of the light-sensing element in the tubular sleeve.

4. A control as set forth in claim 3, in which the light-sensing element is a silicon cell.

5. A control as set forth in claim 4, further including a temperature compensating circuit coupled with the silicon cell, said circuit including a silicon diode positioned proximate the silicon cell and having temperature characteristics equal to those of the silicon cell and means for matching said silicon diode with said silicon cell to negate the effect of temperature changes on said silicon cell.

6. The control of claim 1, wherein the camera has an upper surface and a pair of side surfaces joined to the upper surface and wherein the control unit has external dimensions substantially defined by planes through the upper and side surfaces of the camera.

7. The control of claim 6, wherein the second diaphragm gear, potentiometer, shutter speed gear and film speed adjusting means are axially aligned to form one sub-unit; wherein the reversible D.C. electric motor and the first diaphragm gear are axially aligned to form a second sub-unit, and wherein the sub-units are mounted in spaced relation on the accessory mount assembly with the light-sensing element disposed therebetween to form a saddle-shaped configuration about said lens.

8. A control as set forth in claim 5, wherein the silicon diode has an anode and a cathode and the silicon cell has positive and negative electrodes and wherein the temperature-compensating circuit includes:
   a positive conductor and a negative conductor,
   a voltage divider connected between the positive and negative conductors, said voltage divider having a fixed resistance connected to the positive conductor, a trimming potentiometer in series with the fixed resistance and connected to the negative conductor and a central contact point between the fixed resistance and trimming potentiometer connected to the negative electrode of the silicon cell,
   a field-effect transistor having a d-electrode connected to the positive conductor, an s-electrode connected to the anode of the silicon diode, and a g-electrode connected to the positive electrode of the silicon cell, and
   a second fixed resistance connected between the cathode of the silicon diode and the negative conductor.

9. The control of claim 1, wherein the shutter, shutter speed ring, diaphragm and diaphragm ring are disposed between the accessory mount and the camera when the lens is assembled with a camera so that said accessory mount and control are removed from and mounted on said lens without disturbing the shutter, shutter speed ring, diaphragm and diaphragm ring.

10. A control as set forth in claim 1, wherein the potentiometer comprises;
   a disc of insulating material having opposite sides and rotatable to different angular positions, a carbon path, the resistance of which is a linear function of its length, deposited on one side of the disc, said carbon path terminating in two end points, a contact on said second diaphragm gear for engaging said carbon path at locations thereon selected by rotation of said diaphragm ring, a metal coating on the opposite sides of the contact disc, said metal coating electrically connecting said end points, and a pair of fixed contacts always engaging said metal coating to maintain electrical contact with the end points regardless of the position of the contact disc.

11. A control as set forth in claim 10, further including:

shaft means for coaxially mounting said film speed adjusting means, said shutter speed gear means, said second diaphragm gear and said disc in axial alignment, means for positively connecting said film speed adjusting means and said shutter speed gear means to said disc for rotating said disc upon rotation of said film speed adjusting means and said shutter speed gear means, means for rotatably mounting said second diaphragm gear on said shaft means to rotate independently of said film speed adjusting means, said shutter speed gear means and said disc, and clutch means for selectively disconnecting said shutter speed gear means from said film speed means to adjust said potentiometer according to a selected film speed independently of said shutter speed.

12. A control as set forth in claim 11, wherein the shutter speed gear is mounted for rotation relative to said shaft means and wherein said control further includes spring means for biasing said clutch to positively engage said shutter speed gear means.

13. A control as set forth in claim 12, wherein the spring means is a spring washer mounted on said shaft means and wherein the film speed adjusting means has a rotary knob secured to said shaft which, when pressed axially of said shaft, compresses the spring washer to disengage said clutch.

14. A control as set forth in claim 1, further comprising:

a reduction gear disposed between said motor and said first diaphragm gear, said reduction gear meshing with said first diaphragm gear, and a common housing for containing said motor and said reduction gear.

15. A control as set forth in claim 14, including a brake for said motor including short-circuit switch means in said circuit means for shorting said motor when the circuit is balanced.

16. A control as set forth in claim 15, including a pair of limit switches on said common housing, said switches including a fixed member having a pair of spaced contacts and a rotatable member having a unitary contact thereon.

17. A control as set forth in claim 16, further including:

a guide pin projecting from said rotatable member, and a pair of opposed springs on said fixed member for engaging said guide pin to bias said rotatable member to a position where the limit switches are both closed.

18. A control as set forth in claim 17, wherein the diaphragm ring has a pair of spaced abutments thereon indicative of rotational limits of said diaphragm ring and wherein the rotatable member has a cam thereon disposed between said spaced abutments which is engaged by said spaced abutments when said diaphragm ring rotates to said limits and which rotates said rotatable member against the bias of either of said springs to open one of said switches.

19. A control as set forth in claim 1, further including:

a drive shaft driven by the motor and mounting the first diaphragm gear, and a slip clutch disposed between said drive shaft and said first diaphragm gear to limit stresses transferred between the motor and the control.

20. A control as set forth in claim 19, wherein said slip clutch includes:

a flange mounted on said drive shaft, a face in said first diaphragm gear disposed opposite said flange, a friction flange between said flange and said face, a friction lining on each side of said friction flange, one of said friction linings disposed opposite said face, and a spring washer between said face and the friction lining opposite said face for releasably coupling said first diaphragm gear to said drive shaft with a predetermined force.

21. A control as set forth in claim 1, wherein said circuit means includes a switch comprising:

a circuit board, a pair of contacts on said circuit board, a contact spring having one end secured to one of said contacts and the other end biased away from the other of said contacts to create a normally open circuit, and a button disposed adjacent to said spring for overcoming the bias of said spring to close said normally open circuit and energize the control.

* * * * *